(12) United States Patent
Caron-L'Ecuyer et al.

(10) Patent No.: US 11,514,880 B2
(45) Date of Patent: Nov. 29, 2022

(54) CUSHIONING ELEMENT WITH TUNED ABSORBER

(71) Applicant: BOMBARDIER INC., Dorval (CA)

(72) Inventors: Alexis Caron-L'Ecuyer, Lachine (CA); Andre Brodeur, Laval (CA); Thineshan Kathirchelvan, Markham (CA); Raymond Lee Man Wong, Thornhill (CA)

(73) Assignee: BOMBARDIER INC., Dorval (CA)

( * ) Notice: Subject to any disclaimer, the term of this patent is extended or adjusted under 35 U.S.C. 154(b) by 518 days.

(21) Appl. No.: 16/466,440

(22) PCT Filed: Dec. 5, 2017

(86) PCT No.: PCT/IB2017/057665
§ 371 (c)(1),
(2) Date: Jun. 4, 2019

(87) PCT Pub. No.: WO2018/104868
PCT Pub. Date: Jun. 14, 2018

(65) Prior Publication Data
US 2020/0074972 A1    Mar. 5, 2020

Related U.S. Application Data

(60) Provisional application No. 62/430,036, filed on Dec. 5, 2016.

(51) Int. Cl.
*G10K 11/168* (2006.01)
*B64D 11/06* (2006.01)
*G10K 11/172* (2006.01)

(52) U.S. Cl.
CPC ........ *G10K 11/168* (2013.01); *B64D 11/0647* (2014.12); *G10K 11/172* (2013.01)

(58) Field of Classification Search
CPC . G10K 11/168; G10K 11/172; B64D 11/0647
(Continued)

(56) References Cited

U.S. PATENT DOCUMENTS 5,054,145 A     10/1991  Tsuchyia et al.
5,283,918 A *    2/1994  Weingartner ............ A47C 7/26
                                                            297/452.53

(Continued)

FOREIGN PATENT DOCUMENTS

DE    102016117650 A1 *  3/2017  ......... B60R 13/0212
EP        3409468 A1 * 12/2018  ............. B32B 5/026

(Continued)

OTHER PUBLICATIONS

PCT International Search Report and Written Opinion dated Mar. 9, 2018 re: International Application No. PCT/IB2017/057665.

*Primary Examiner* — Forrest M Phillips
(74) *Attorney, Agent, or Firm* — Norton Rose Fulbright Canada LLP

(57) ABSTRACT

A cushioning element for use in a vehicle, for example in an aircraft, includes at least one tuned absorber embedded within the cushioning element. The tuned absorber is tuned to absorb noise at a predetermined frequency of at least 20 Hz. A method of providing noise absorption within a cabin of a vehicle includes determining a predetermined frequency of at least 20 Hz of an undesirable noise within the cabin, and configuring an internal structure of a cushioning element to define a tuned absorber tuned to absorb noise at the predetermined frequency, the cushioning element in use being located in the cabin.

15 Claims, 6 Drawing Sheets

(58) Field of Classification Search
USPC .......................................................... 181/141
See application file for complete search history.

(56) References Cited

U.S. PATENT DOCUMENTS

| | | | |
|---|---|---|---|
| 6,033,756 A | 3/2000 | Handscomb | |
| 6,648,100 B2 | 11/2003 | Ebbitt | |
| 7,677,660 B2* | 3/2010 | Galbreath | ................ B60N 2/70 |
| | | | 297/217.1 |
| 8,657,067 B1* | 2/2014 | Mathur | ..................... B32B 7/12 |
| | | | 181/292 |
| 10,077,011 B1* | 9/2018 | Gur | ..................... B60R 13/0861 |
| 2003/0075383 A1 | 4/2003 | Ebbitt | |
| 2009/0066127 A1 | 3/2009 | Galbreath et al. | |
| 2009/0120717 A1* | 5/2009 | Tanase | ................. G10K 11/172 |
| | | | 181/284 |
| 2012/0155688 A1 | 6/2012 | Wilson | |
| 2013/0118831 A1* | 5/2013 | Kawai | .................. G10K 11/168 |
| | | | 181/290 |
| 2013/0257133 A1* | 10/2013 | Reedy | ..................... B60N 2/70 |
| | | | 297/452.38 |

FOREIGN PATENT DOCUMENTS

| | | |
|---|---|---|
| WO | 2015193671 A1 | 12/2015 |
| WO | WO-2018187000 A1 * | 10/2018 ............... B32B 5/00 |

* cited by examiner

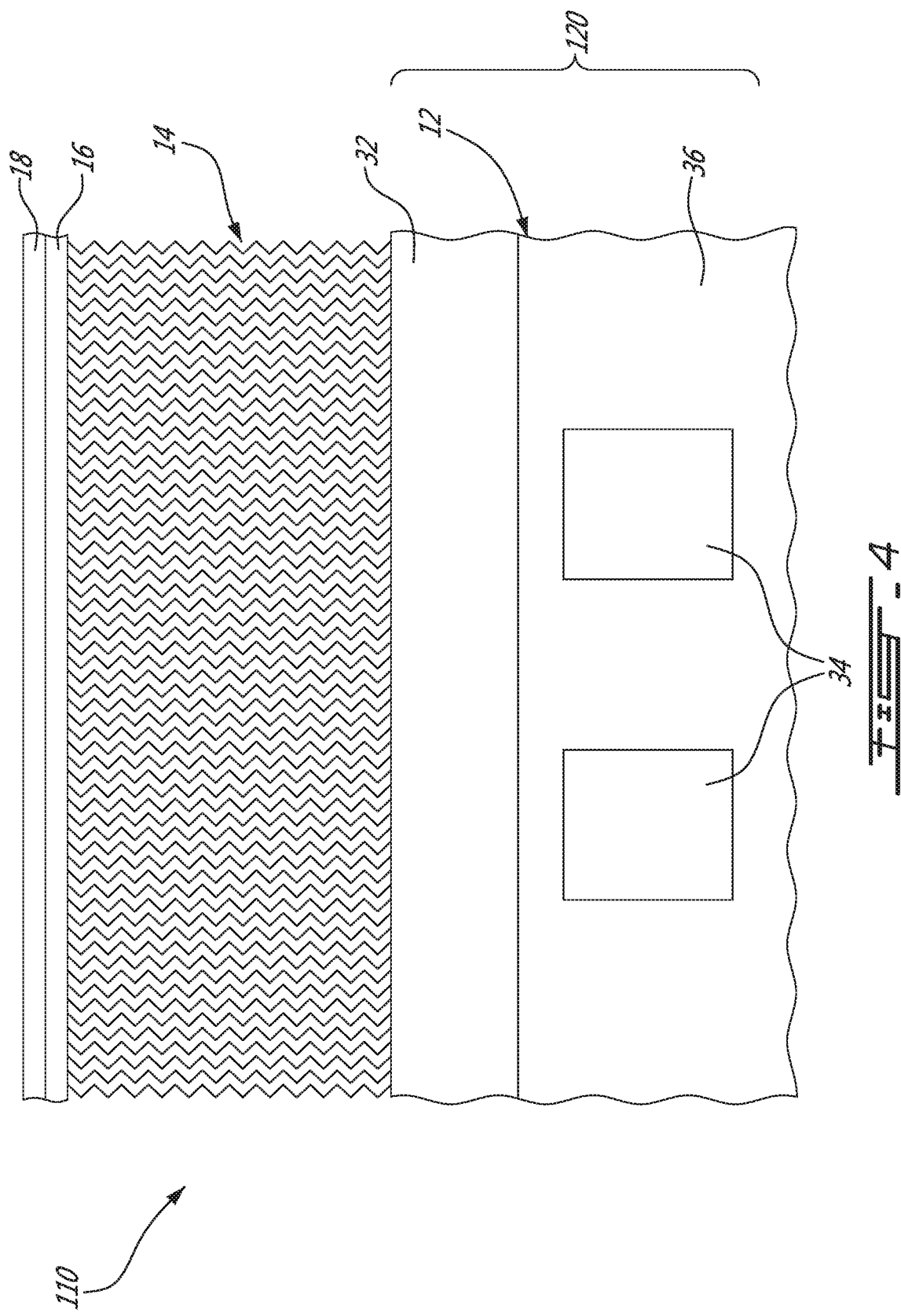

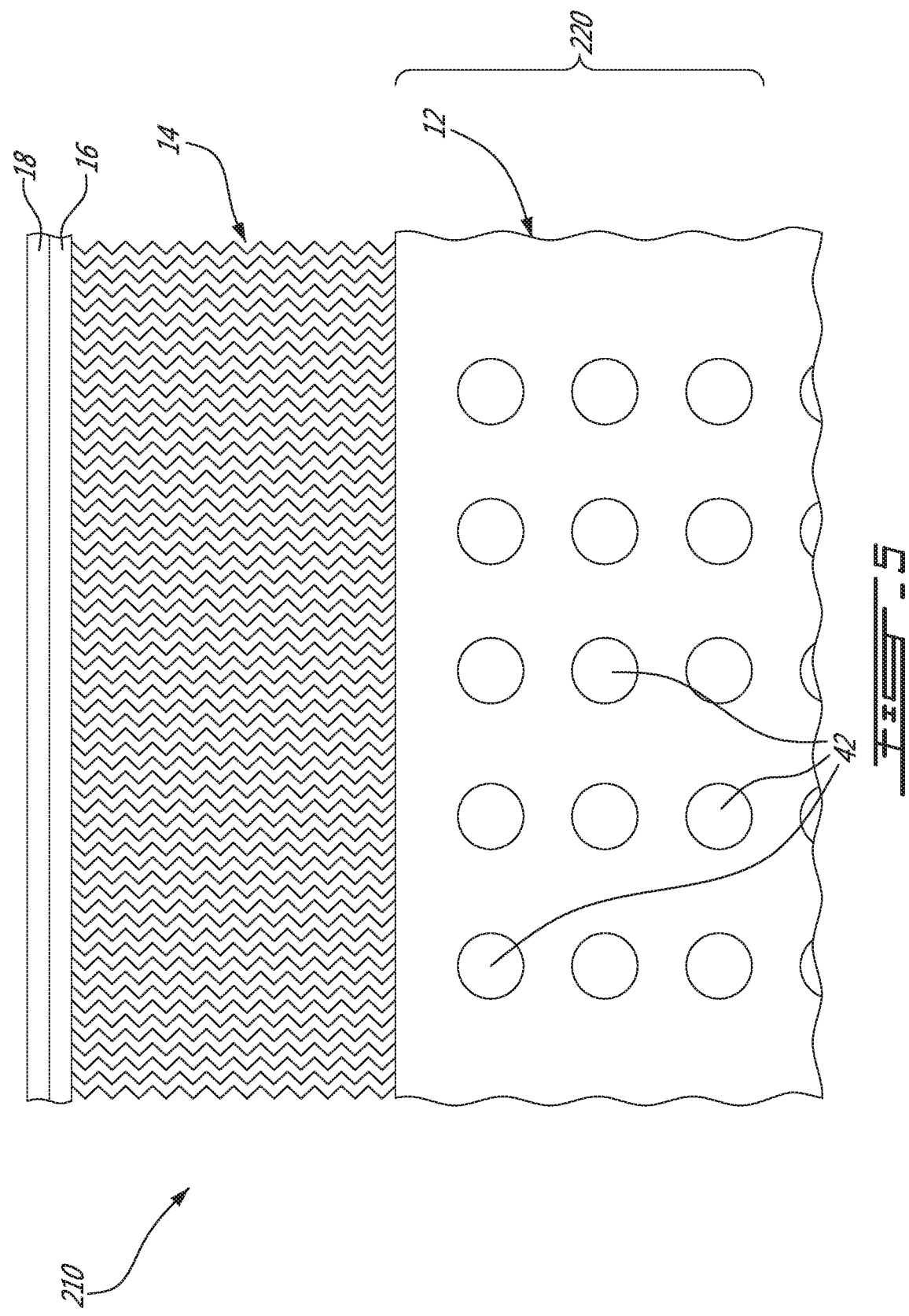

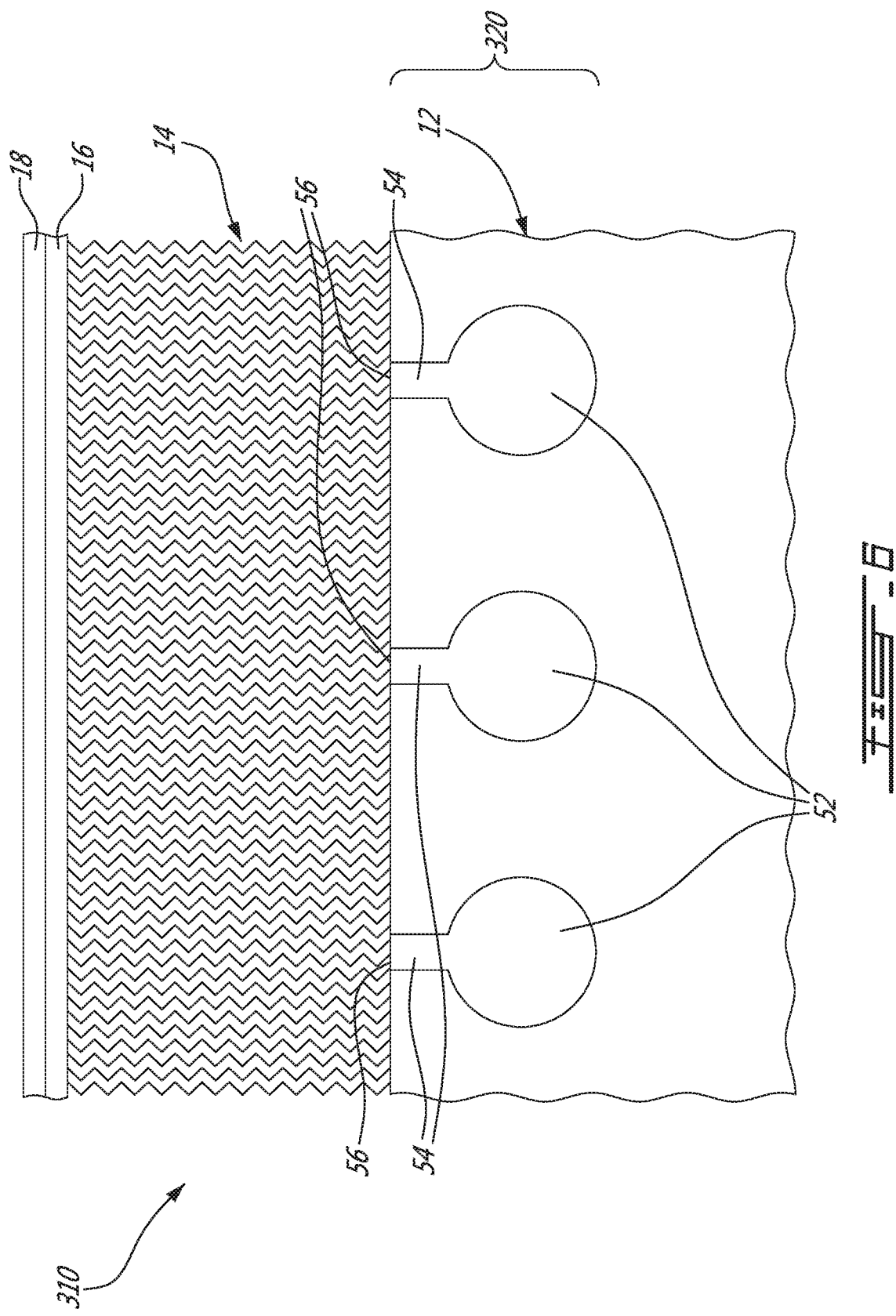

CUSHIONING ELEMENT WITH TUNED ABSORBER

CROSS-REFERENCE TO RELATED APPLICATIONS

This application is a national phase application under 35 U.S.C. 371 of International Patent Application No. PCT/IB2017/057665 filed on Dec. 5, 2017, which claims priority from U.S. provisional application No. 62/430,036 filed Dec. 5, 2016, the entire contents of which are incorporated by reference herein.

TECHNICAL FIELD

The application relates generally to noise absorption and, more particularly, to noise absorption in vehicle cabins such as aircraft cabins.

BACKGROUND OF THE ART

Aircraft engines and other rotating components can produce tonal noise which may be an irritant for aircraft passengers. Reduction of tonal noise in the aircraft cabin is typically obtained by adding dampening material on the fuselage, for example around and in proximity of the engines. Dampening material and structures may be heavy, structurally difficult to implement, and/or require new certification for example when integrated into engine attachments.

SUMMARY

In one aspect, there is provided a cushioning element for use in a vehicle, the cushioning element including at least one tuned absorber embedded within the cushioning element, the tuned absorber tuned to absorb noise at a predetermined frequency of at least 20 Hz.

In a particular embodiment, the predetermined frequency is at least 50 Hz.

In a particular embodiment, a frequency distribution of sound absorption coefficient of the cushioning element defines a peak at the predetermined frequency, the peak corresponding to a value of sound absorption coefficient at least 5% above a sound absorption coefficient of the cushioning element at frequencies adjacent the predetermined frequency. The value of sound absorption coefficient at the peak may be at least 10% above the sound absorption coefficient of the cushioning element at frequencies adjacent the predetermined frequency.

In a particular embodiment, the cushioning element includes an outer envelope defining an outer surface of the cushioning element, the outer envelope being unperforated.

In a particular embodiment, the predetermined frequency is at most 100 Hz, or within a range defined from 100 Hz to 500 Hz.

In particular embodiment, the cushioning element includes a top layer of material supported by a plurality of springs, the tuned absorber being defined by the springs and top layer.

In particular embodiment, the cushioning element includes a foam core, and the tuned absorber is defined in the foam core and includes portions of the foam core having a different density and/or stiffness than a remainder of the foam core.

In particular embodiment, the cushioning element includes a foam core and the tuned absorber is defined in the foam core and includes voids within the foam core. The voids may be in fluid communication with ports having a smaller cross-sectional area than that of the voids, the voids defining resonators.

In a particular embodiment, an assembly includes the above cushioning element wherein the cushioning element is a first cushioning element and the predetermined frequency is a first predetermined frequency, and further comprises a second cushioning element including at least one second tuned absorber embedded within the second cushioning element, the second tuned absorber tuned to absorb noise at a second predetermined frequency greater than the first predetermined frequency. The first cushioning element may be a mattress and the second cushioning element may be a seat cushion having a smaller volume than the mattress.

In another aspect, there is provided a method of providing noise absorption within a cabin of a vehicle, the method comprising: determining a predetermined frequency of at least 20 Hz of an undesirable noise within the cabin; and configuring an internal structure of a cushioning element to define a tuned absorber tuned to absorb noise at the predetermined frequency, the cushioning element in use being located in the cabin.

In a particular embodiment, the predetermined frequency is at least 50 Hz.

In a particular embodiment, the cushioning element includes a top layer of material supported by a plurality of springs, and configuring the internal structure of the cushioning element includes at least one of changing properties of the springs and changing a mass of the top layer of material.

In a particular embodiment, the cushioning element includes a foam core, and configuring the internal structure of the cushioning element includes providing portions of the foam core having a different density and/or stiffness than a remainder of the foam core.

In a particular embodiment, the cushioning element includes a foam core, and configuring the internal structure of the cushioning element includes defining voids within the foam core. The method may further comprise defining ports having a smaller cross-sectional area than that of the voids and in fluid communication with the voids so that the voids define resonators.

In a particular embodiment, configuring the internal structure of the cushioning element is performed without perforating an outer envelope defining an outer surface of the cushioning element.

In a particular embodiment, configuring the internal structure of the cushioning element is performed until a frequency distribution of sound absorption coefficient of the cushioning element defines a peak at the predetermined frequency, the peak corresponding to a value of sound absorption coefficient at least 5% above a sound absorption coefficient of the cushioning element at frequencies adjacent the predetermined frequency.

In a particular embodiment, the predetermined frequency is a first frequency, and the method further comprises: determining a second frequency of another undesirable noise within the cabin, the second frequency higher than the first frequency; and configuring an internal structure of an additional cushioning element to define a tuned absorber tuned to absorb noise at the second frequency, the additional cushioning element in use being located in the cabin.

In a further aspect, there is provided a cushioning element including at least one tuned absorber embedded within the cushioning element, the tuned absorber tuned to absorb noise at a predetermined frequency of at least 20 Hz.

DESCRIPTION OF THE DRAWINGS

For a better understanding of the present invention, as well as other aspects and further features thereof, reference is made to the following description which is to be used in conjunction with the accompanying drawings, where:

FIGS. 4-6 are schematic cross-sectional views of parts of cushioning elements which may be used in an aircraft such as shown in FIG. 1, in accordance with various alternate embodiments.

Figure 1:
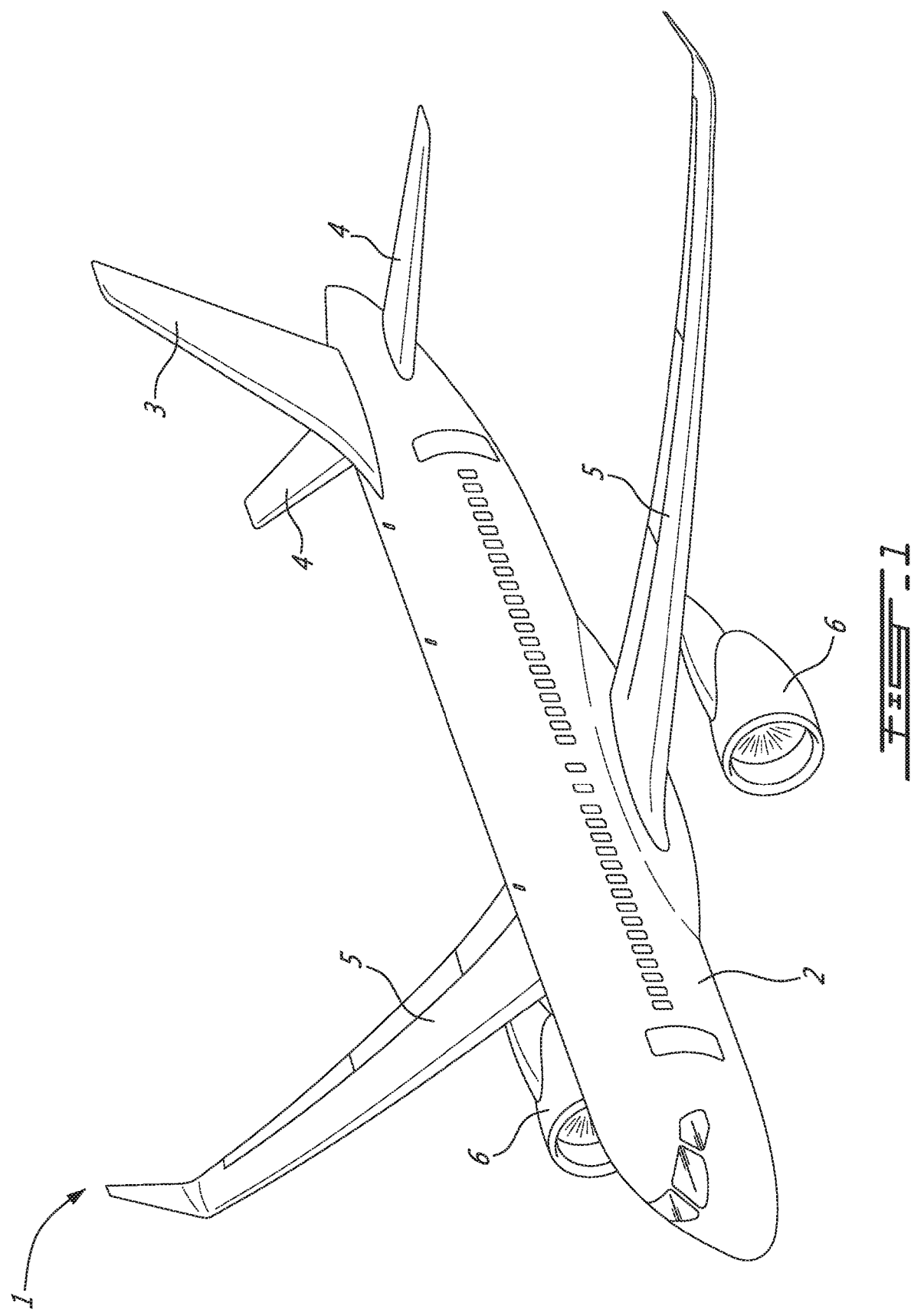
FIG. 1 is a schematic tridimensional view of an aircraft in accordance with a particular embodiment.

In the drawings, embodiments of the invention are illustrated by way of example. It is to be expressly understood that the description and drawings are only for purposes of illustration and as an aid to understanding. They are not intended to be a definition of the limits of the invention.

DETAILED DESCRIPTION

Referring to the drawings and more particularly to FIG. 1, an aircraft is shown at 1, and is generally described to illustrate some components for reference purposes in the present disclosure. The aircraft 1 has a fuselage 2 having a fore end at which a cockpit is located, and an aft end supporting a tail assembly, with the cabin generally located between the cockpit and the tail assembly. The tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage. The aircraft 1 has engines 6 supported by the wings 5, although the engines 6 could also be mounted to the fuselage 2. The aircraft 1 is shown as a jet-engine aircraft, but may also be a propeller aircraft.

Rotating or vibrating components of the aircraft 1 can produce tonal noise; cavity resonance may also produce tonal noise. Tonal noise can be defined by a noise concentrated in a narrow part of the spectrum or containing a high proportion of energy at a single frequency or within a limited frequency range—as opposed to non-tonal noise which is typically spread over a wide band of frequencies. Tonal noise is generally more noticeable than non-tonal noise of the same level, and accordingly dampening of the tonal noise within the aircraft cabin is desirable.

Tonal noise generated by rotating components has a predictable frequency which depends on the rotational speed and structure of the rotating components. For example, the engine 6 may include low pressure and high pressure rotatable shafts producing tonal noise at different frequencies, these frequencies being affected by the number of blades connected to the shaft, vanes interacting with the flow, etc. Other rotatable components may also produce tonal noise, for example gearboxes. Other systems may also produce tonal noise, including, but not limited to, hydraulic systems (e.g. hydraulic pumps), electrical transformers, other types of turbines/fans/compressors, pumps, propellers, cavities (cavity resonance), etc.

The aircraft cabin may contain several cushioning elements, for example seat cushions (seating surface, back rest), sofa cushions (seating surface, back rest), pillows, and, in cabin configurations including sleeping quarters, mattresses. The term "cushioning element" as used herein is intended to include any soft and/or padded and/or impact absorbing element designed for comfort of the user for sitting, kneeling or lying thereon, as well as any soft and/or padded and/or impact absorbing element designed to absorb impacts, for example overlaying a structure of the cabin (e.g. cabinet) to prevent injury of users upon impact with such structure. Cushioning elements may include padding material (e.g. foam layer(s), foam beads, feathers, unwoven fabric, open or closed cell foam, etc.) and/or springs. Cushioning elements may include an outer envelope made of cloth, other types of fabric, natural or synthetic leather, etc.

In the present specification, tuned absorbers are embedded in cushioning elements to reduce noise at particular frequencies, for example frequencies corresponding to the tonal noise such as generated by the aircraft engine(s). In some embodiments, the embedded tuned absorber as a whole is not visible from outside of the cushioning element. In other embodiments the outer envelope of the cushioning element may be part of the tuned absorber, however the remaining part of the embedded tuned absorber is not visible from outside of the cushioning element, and the apparent outer surface of the outer envelope is preferably not modified to be part of the tuned absorber (e.g., the outer envelope is not perforated). The cushioning element may accordingly include the tuned absorber without changing its appearance, i.e. without affecting the esthetic aspect of the cushioning element.

The term "tuned absorber" as used herein is intended to include any apparatus that is tuned to absorb noise at a specific frequency. Non-limiting examples of tuned absorbers are provided in the exemplary embodiments described below.

Figure 2:
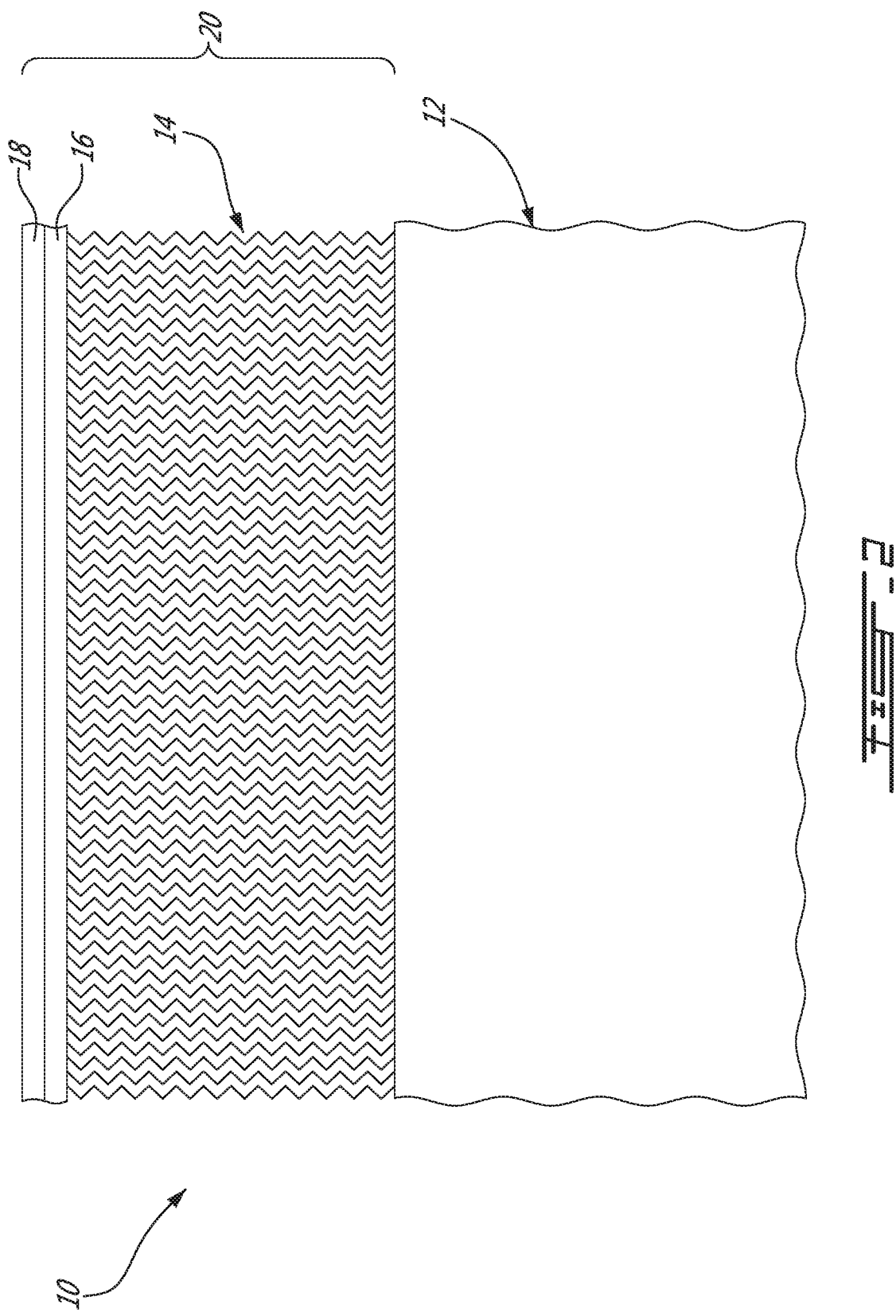
FIG. 2 is a schematic cross-sectional view of part of a cushioning element which may be used in an aircraft such as shown in FIG. 1, in accordance with a particular embodiment.

Referring to FIG. 2, a cushioning element 10 in accordance with a particular embodiment is shown, which may be for example a mattress. The cushioning element 10 includes a foam core 12, a plurality of springs 14 extending from the foam core 12, and a top layer 16 of material supported by the springs 14. The bottom of the cushioning element 10 may be a mirror image of the layup shown, so that the cushioning element 10 is reversible; alternately, the foam core 12 may define the bottom of the cushioning element 10, or the foam core 12 may be omitted. Other variations are possible, including, but not limited to, two or more superimposed layers of springs 14, a layer of springs 14 sandwiched between two foam cores 12, etc.

An outer layer 18 overlays the top layer 16 and defines an outer surface of the cushioning element 10. In a particular embodiment, the outer layer 18 forms or is part of an outer envelope defining the outer surface of the entire cushioning element 10; in a particular embodiment, this outer envelope is unperforated, i.e. it does not include holes other than the voids which may be naturally present in the structure of the fabric forming the outer envelope (e.g. space between woven fibers, voids of open cell material).

In a particular embodiment, the foam core 12 is made of a suitable open cell foam, for example a polyurethane foam. Other suitable materials may alternately be used, including, but not limited to, closed cell foam or semi open cell foam; fluoropolymer foam, polyamide foam, thermoplastic elastomer foam.

In a particular embodiment, the springs 14 are made of plastic filaments. Other suitable spring materials include, but are not limited to, suitable metals, unwoven fabrics, and open or closed cell foams. Although schematically depicted with a zigzag shape, it is understood that the springs 14 may have any other suitable configuration (e.g. a curved C-type shape) allowing the springs 14 to bias the top and outer layers 16, 18 upwardly and provide an adequate resistance force against a weight applied on the top and outer layers 16, 18.

In a particular embodiment, the top and outer layers 16, 18 are both fabric layers; different fabrics may be used. Examples are suitable fabrics include, but are not limited to, leather, silk, wool, synthetic leather, suede, Ultrasuede®, woven or unwoven fabric. Although two layers 16, 18 are shown on top of the springs 14, it is understood that alternately a single layer may be provided, or more than two layers.

In this embodiment, the tuned absorber 20 embedded in the cushioning element 10 is defined by the spring-mass system formed by the springs 14 and the layer(s) 16, 18 of material supported by the springs 14. The spring-mass system is tuned to the predetermined noise frequency (e.g. tonal noise frequency) to be absorbed. Such tuning can be done by changing the properties of the springs 14, for example by changing the number of springs 14, the wire diameter, internal spring diameter, external spring diameter, pitch, stiffness, preload, shape and/or length of the springs 14, etc. Such tuning can also be done by changing the mass supported by the springs 14, for example by varying the number and/or the thickness of the layer(s) 16, 18 of material on top of the springs 14, and/or the density of the material used in the layer(s) 16, 18 on top of the springs 14. The properties of the springs 14 and/or mass of the layer(s) 16, 18 supported by the springs 14 are varied until the cushioning element 10 is tuned to the predetermined noise frequency. Verification of the tuning of the cushioning element may be done for example by measuring and plotting the sound absorption coefficient of the cushioning element over a wide range of frequencies.

Figure 3:
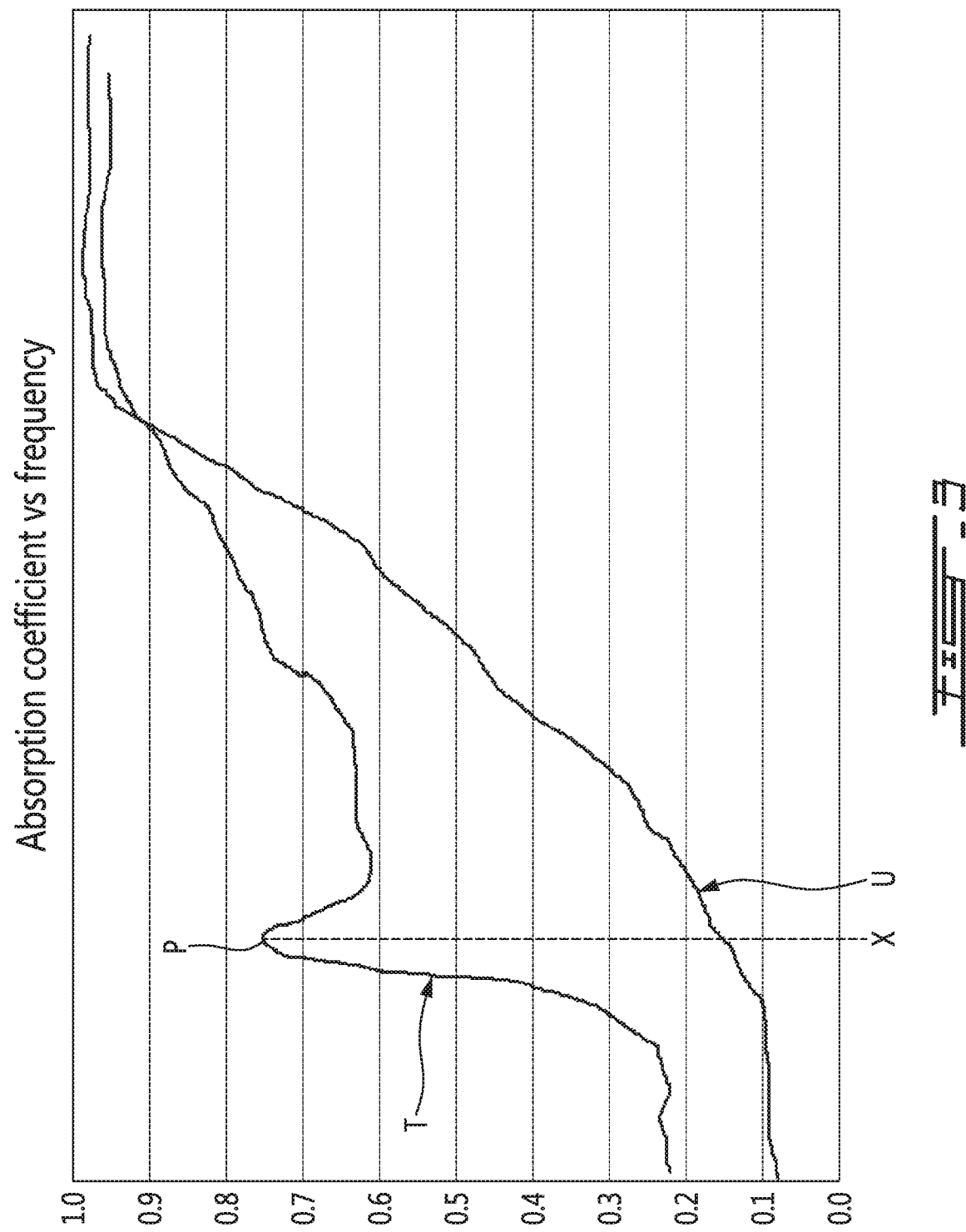
FIG. 3 shows exemplary graphs of a frequency distribution of a sound absorption coefficient for a cushioning element in accordance with a particular embodiment and for an un-tuned foam mattress.

Referring to FIG. 3, an exemplary plot T of the sound absorption coefficient for a tuned cushioning element (i.e. a cushioning element including a tuned vibration absorber, such as cushioning element 10) and an exemplary plot U of the sound absorption coefficient for an un-tuned foam cushioning element are shown. The sound absorption coefficient α is defined as the ratio of energy absorbed by a material to the energy incident upon its surface, and can be calculated as $$1 - \frac{I_R}{I_I}$$

where $I_R$ is the one-sided intensity of the reflected sound and $I_I$ is the one-sided intensity of the incident sound. It can be seen that the plot T of the tuned cushioning element defines a peak P at frequency X—the tuned absorber of the cushioning element is tuned to absorb noise, for example tonal noise, at frequency X. By contrast, the variation of the sound absorption coefficient of the un-tuned foam mattress does not define such a peak.

The peak P does not necessarily define the maximum sound absorption coefficient of the cushioning element, but represents a significant local increase in the sound absorption coefficient curve. In a particular embodiment, the peak P corresponds to a sound absorption coefficient value at least 5% above the sound absorption coefficient at adjacent frequencies; in a particular embodiment, the peak P corresponds to a sound absorption coefficient value at least 10% above the sound absorption coefficient at adjacent frequencies.

The frequency X for which the tuned absorber (and accordingly the cushioning element) is tuned is a frequency value within the audible range, and corresponds to the frequency of a noise (e.g. tonal noise) to be absorbed. In a particular embodiment, the frequency X has a value of at least 20 Hz, and in another particular embodiment the frequency X has a value of at least 50 Hz. In a particular embodiment, the frequency X is within the range extending from 50 Hz to 100 Hz, which may correspond for example to the frequency of the tonal noise produced by the low pressure (e.g. fan) shaft of each engine 6. In a particular embodiment, the frequency X is within the range extending from 100 Hz to 350 Hz or from 100 Hz to 500 Hz, which may correspond for example to the frequency of the tonal noise produced by the high pressure (core) shaft of each engine 6. Other values are also possible, for example up to 1000 Hz.

Referring to FIG. 4, a cushioning element 110 in accordance with another particular embodiment is shown, suitable to be tuned to absorb noise (e.g. tonal noise) as described above. Elements similar to that of the cushioning element 10 of FIG. 2 are identified by the same reference numerals and will not be further described herein. Although the cushioning element 110 is shown as including the springs 14 and top layer 16, it is understood that alternately the springs 14 and/or top layer 16 may be omitted. For example, the cushioning element 110 may include only the foam core 12 and the outer layer 18 defining the outer envelope and outer surface of the cushioning element 110.

In this embodiment, the tuned absorber 120 is defined in the foam core 12. The foam core 12 includes one or more portion(s) 32, 34 having a different density and/or stiffness than the remainder 36 of the foam core 12. In the embodiment shown, a portion 32 of the foam core 12 having a different density/stiffness than the remainder 36 of the foam core 12 is defined as a foam layer superimposed over the remainder 36 of the foam core and extending along an entire width and length of the cushioning element 110. Portions 34 of the foam core having a different density/stiffness than the remainder 36 of the foam core 12 are also defined in pieces or blocks, shown here with a rectangular cross-section, embedded in the remainder 36 of the foam core 12. It is understood that the portion(s) of the foam core having a different density/stiffness than the remainder of the foam core may be defined only as superimposed layer(s) or only as embedded piece(s), and that the shape of the embedded pieces may be varied.

The portion(s) 32, 34 of the foam core 12 having a different density/stiffness define the tuned absorber 120. The tuned absorber 120 can be tuned by changing the size and/or number of the portion(s) 32, 34 of the foam core 12 having a different density/stiffness, or by selecting a particular density/stiffness (e.g., a particular foam material) used in the portion(s) 32, 34 of the foam core 12 having a different density/stiffness. The size, number and/or density/stiffness of the portion(s) 32, 34 of the foam core 12 having a different density/stiffness are varied until the cushioning element 110 is tuned to the predetermined noise frequency (e.g. tonal noise frequency). Different regions of the cushioning element 110 can be tuned to absorb noise of different frequencies. Verification of the tuning of the cushioning element 110 with the tuned absorber 120 may be done for example by measuring and plotting the sound absorption coefficient of the cushioning element 110 over a wide range of frequencies to determine the position of the peak(s) P, as set forth above.

Referring to FIG. 5, a cushioning element 210 in accordance with another particular embodiment is shown, suitable to be tuned to absorb noise (e.g. tonal noise) as described above. Elements similar to that of the previously described cushioning elements 10, 110 are identified by the same reference numerals and will not be further described herein. Although the cushioning element 210 is shown as including the springs 14 and top layer 16, it is understood that alternately the springs 14 and/or top layer 16 may be omitted. For example, the cushioning element 210 may include only the foam core 12 and the outer layer 18 defining the outer envelope and outer surface of the cushioning element 210.

In this embodiment, the tuned absorber 220 is also defined in the foam core 12. The foam core 12 include voids 42 (i.e. portions free of foam, filled for example with ambient air) formed in the foam core 12. Although the voids 42 are shown as being defined in a regular pattern of spherical voids, it is understood that the shape and distribution of the voids 42 may vary.

The voids 42 in the foam core 12 define the tuned absorber 220. The tuned absorber 220 can be tuned by changing the size, number, pattern and/or distribution of voids 42 provided in the foam core 12. The size, number, pattern and/or distribution of voids 42 in the foam core 12 are varied until the cushioning element 210 is tuned to the predetermined noise frequency (e.g. tonal noise frequency). Different regions of the cushioning element 110 can be tuned to absorb noise of different frequencies. Verification of the tuning of the cushioning element 210 with the tuned absorber 220 may be done for example by measuring and plotting the sound absorption coefficient of the cushioning element 210 over a wide range of frequencies to determine the position of the peak(s) P, as set forth above.

Referring to FIG. 6, a cushioning element 310 in accordance with another particular embodiment is shown, suitable to be tuned to absorb noise (e.g. tonal noise) as described above. Elements similar to that of the previously described cushioning elements 10, 110, 210 are identified by the same reference numerals and will not be further described herein. Although the cushioning element 310 is shown as including the springs 14 and top layer 16, it is understood that alternately the springs 14 and/or top layer 16 may be omitted. For example, the cushioning element 310 may include only the foam core 12 and the outer layer 18 defining the outer envelope and outer surface of the cushioning element 310.

In this embodiment, the tuned absorber 320 is also defined in the foam core 12. The foam core include voids 52 (i.e. portions free of foam, filled for example with ambient air) formed in the foam core 12, in fluid communication with ports 54 having a smaller cross-sectional area than the voids 52. Although the voids 52 are shown as being defined as spaced apart spherical voids, it is understood that the shape, pattern and distribution of the voids 52 may vary. The ports 54 may each define a neck extending from the respective void 52 to an opening 56 defined in the surface of the foam core 12, as shown.

The voids 52 with ports 54 may define Helmholtz resonators, where the volume of air in and near the port 54 vibrates and produces air resonance at a particular frequency—the air trapped in and near the port 54 acts as a mass and the air in the void 52 itself acts as a spring. The voids 52 with ports 54, or resonators, thus define the tuned absorber 320. The tuned absorber 320 can be tuned by changing the size, number, pattern and/or distribution of voids 52 provided in the foam core 12 and/or of the relative size of their ports 54. The size, number, pattern and/or distribution of voids 52 in the foam core 12 and/or size of their ports 54 are varied until the cushioning element 310 is tuned to the predetermined noise frequency (e.g. tonal noise frequency). Different regions of the cushioning element 110 can be tuned to absorb noise of different frequencies, for example by having different resonators tuned to different frequencies. Verification of the tuning of the cushioning element 310 with the tuned absorber 320 may be done for example by measuring and plotting the sound absorption coefficient of the cushioning element over a wide range of frequencies to determine the position of the peak(s) P, as set forth above.

In a particular embodiment, an assembly of cushioning elements 10, 110, 210, 310 is provided in the aircraft cabin, including tuned absorbers 20, 120, 220, 320 tuned to absorb noise of different frequencies. For example, cushioning element(s) 10, 110, 210, 310 with a relatively large volume (e.g. mattress), may be tuned to absorb a relatively low frequency tonal noise (e.g. engine noise), while cushioning element(s) 10, 110, 210, 310 with a smaller volume (e.g., seat cushion) may be tuned to absorb tonal noise of higher frequency(ies) (e.g. hydraulic system noise).

In a particular embodiment and in use, noise absorption can thus be provided within the cabin of the aircraft by determining a predetermined frequency of at least 20 Hz or at least 50 Hz of an undesirable noise within the cabin, and configuring an internal structure of the cushioning element 10, 110, 210, 310 used in the cabin to defined a tuned absorber 20, 120, 220, 320 tuned to absorb noise at the predetermined frequency. As detailed above, configuring the internal structure of the cushioning element 10, 110, 210, 310 may include one or more of: changing properties of the springs 14; changing a mass of the layer(s) 16, 18 of material supported by the springs 14; providing portions 32, 34 of the foam core 12 having a different density and/or stiffness than other adjacent portions 36 of the foam core 12; defining voids 42, 52 within the foam core 12. When voids 42, 52 are defined, configuring the internal structure of the cushioning element 10, 110, 210, 310 may include defining ports 54 having a smaller cross-sectional area than that of the voids 52 and in fluid communication with the voids 52 so that the voids 52 and ports 54 define resonators.

In a particular embodiment, the internal structure of the cushioning element 10, 110, 210, 310 is performed without perforating an outer envelope defining an outer surface of the cushioning element 10, 110, 210, 310.

As set forth above, the internal structure of the cushioning element 10, 110, 210, 310 may be configured until a frequency distribution of sound absorption coefficient of the cushioning element 10, 110, 210, 310 defines a peak P in sound absorption coefficient at the predetermined frequency. The peak P may correspond to a value of sound absorption coefficient at least 5%, or at least 10%, above a sound absorption coefficient of the cushioning element 10, 110, 210, 310 at frequencies adjacent the predetermined frequency.

Providing the noise absorption can further include determining a second frequency of another undesirable noise within the cabin, higher than the first frequency, and similarly configuring the internal structure of an additional cabin cushioning element 10, 110, 210, 310 to define a tuned absorber tuned to absorb noise at the second frequency.

In a particular embodiment, the use of existing cushioning elements to provide tuned absorbers allow for tonal noise absorption to be provided without the need to add additional and potentially bulky structure in the aircraft, allowing for tuned absorbers to be provided with no or with minimal impact on the aircraft weight.

Although the cushioning elements 10, 110, 210, 310 have been described as being of the type found in an aircraft cabin, it is understood that alternately the cushioning elements 10, 110, 210, 310 may be any other suitable type of cushioning elements, including but not limited to cushioning elements found in other types of vehicles, and cushioning elements found in other types of environment (e.g., in a building).

It is understood that any two or more of the tuned absorbers 20, 120, 220, 320 described above can be combined in a same cushioning element; as a non-limiting example, the spring-mass system tuned absorber 20 can be combined with any one or any combination of the foam core tuned absorbers 120, 220, 320. Two or more of the foam core tuned absorbers can also be combined. The combined tuned absorbers in a same cushioning element may allow for the cushioning element to be tuned to two or more noise frequencies.

While the methods and systems described herein have been described and shown with reference to particular steps performed in a particular order, it will be understood that these steps may be combined, sub-divided or reordered to form an equivalent method without departing from the teachings of the present invention. Accordingly, the order and grouping of the steps is not a limitation of the present invention.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A cushioning assembly for use in an aircraft with at least one engine, the assembly comprising:
   a first cushioning element having an internal structure including at least a first tuned absorber embedded within the first cushioning element, the first tuned absorber being tuned to absorb noise at a first predetermined frequency of at least 20 Hz; and
   a second cushioning element having an internal structure including at least one second tuned absorber embedded within the second cushioning element, the second tuned absorber tuned to absorb noise at a second predetermined frequency greater than the first predetermined frequency;
   wherein the first predetermined frequency corresponds to a frequency of a tonal noise produced by a low pressure shaft of the at least one engine and the second predetermined frequency corresponds to a frequency of a tonal noise produced by a high pressure shaft of the at least one engine; and
   wherein the respective internal structure of the first and second cushioning elements includes a foam core, the tuned absorber being defined in the foam core and including voids within the foam core, the tuned absorbers being tuned by changing a size, number, pattern or distribution of the voids.

2. The assembly as defined in claim 1, wherein the first predetermined frequency is at least 50 Hz.

3. The assembly as defined in claim 1, wherein the voids are in fluid communication with ports having a smaller cross-sectional area than that of the voids, the voids and ports defining resonators.

4. The assembly as defined in claim 1, wherein a frequency distribution of sound absorption coefficient of the first cushioning element defines a peak at the predetermined frequency, the peak corresponding to a value of sound absorption coefficient at least 5% above a sound absorption coefficient of the first cushioning element at frequencies adjacent the predetermined frequency.

5. The assembly as defined in claim 4, wherein the value of sound absorption coefficient at the peak is at least 10% above the sound absorption coefficient of the first cushioning element at frequencies adjacent the first predetermined frequency.

6. The assembly as defined in claim 1, wherein the first cushioning element includes an outer envelope defining an outer surface of the first cushioning element, the outer envelope being unperforated.

7. The assembly as defined in claim 1, wherein the first predetermined frequency is at most 100 Hz.

8. The assembly as defined in claim 1, wherein the second predetermined frequency is within a range defined from 100 Hz to 500 Hz.

9. The assembly as defined in claim 1, wherein the first cushioning element is a mattress and the second cushioning element is a seat cushion having a smaller volume than the mattress.

10. A method of providing noise absorption with an assembly within a cabin of an aircraft having at least one engine, the method comprising:
    determining a first predetermined frequency of at least 20 Hz of an undesirable noise within the cabin, the first predetermined frequency corresponding to a frequency of a tonal noise produced by a low pressure shaft of the at least one engine;
    determining a second predetermined frequency greater than the first predetermined frequency of an undesirable noise within the cabin, the second predetermined frequency corresponding to a frequency of a tonal noise produced by a high pressure shaft of the at least one engine;
    configuring a foam core of an internal structure of a first cushioning element of the assembly to define a first tuned absorber tuned to absorb noise at the first predetermined frequency; and
    configuring a foam core of an internal structure of a second cushioning element of the assembly to define a second tuned absorber tuned to absorb noise at the second predetermined frequency, the cushioning elements in use being located in the cabin,
    wherein the respective internal structure of the first and second cushioning elements includes the foam core, the tuned absorbers being defined in the foam core and including voids within the foam core, the tuned absorbers being tuned by changing a size, number, pattern or distribution of the void.

11. The method as defined in claim 10, wherein the first predetermined frequency is at least 50 Hz.

12. The method as defined in claim 10, wherein the first cushioning element includes a top layer of material supported by a plurality of springs, and wherein configuring the internal structure of the first cushioning element includes at least one of changing properties of the springs and changing a mass of the top layer of material.

13. The method as defined in claim 10, wherein configuring the internal structure of the first cushioning element is performed without perforating an outer envelope defining an outer surface of the first cushioning element.

14. The method as defined in claim 10, wherein configuring the internal structure of the first cushioning element is performed until a frequency distribution of sound absorption coefficient of the first cushioning element defines a peak at the first predetermined frequency, the peak corresponding to a value of sound absorption coefficient at least 5% above a sound absorption coefficient of the first cushioning element at frequencies adjacent the first predetermined frequency.

15. The method as defined in claim 10, wherein the first cushioning element is a mattress and the second cushioning element is a seat cushion having a smaller volume than the mattress.

\* \* \* \* \*